US006951358B1

(12) United States Patent
Ousley et al.

(10) Patent No.: US 6,951,358 B1
(45) Date of Patent: Oct. 4, 2005

(54) INSERT FOR A TAILGATE CABLE ASSEMBLY AND A TAILGATE CABLE ASSEMBLY INCORPORATING THE SAME

(75) Inventors: Claude D. Ousley, Bolivar, OH (US); James H. Stocker, Mineral City, OH (US); Werner H. Steuernagel, New Philadelphia, OH (US)

(73) Assignee: Cable Manufacturing & Assembly, Inc., Bolivar, OH (US)

( * ) Notice: Subject to any disclaimer, the term of this patent is extended or adjusted under 35 U.S.C. 154(b) by 0 days.

(21) Appl. No.: 10/807,779

(22) Filed: Mar. 23, 2004

(51) Int. Cl.[7] .......................................... B60D 25/00
(52) U.S. Cl. ................................. 296/57.1; 296/26.11
(58) Field of Search .................... 296/57.1, 100.18, 296/39.2, 100.16; 410/112; 24/298, 300; 70/18; 248/74.1

(56) References Cited

U.S. PATENT DOCUMENTS

| | | | | |
|---|---|---|---|---|
| 1,828,797 A | * | 10/1931 | Becker | 296/51 |
| 2,204,697 A | * | 6/1940 | Renno et al. | 296/57.1 |
| 2,955,863 A | * | 10/1960 | Olender | 296/57.1 |
| 4,398,317 A | * | 8/1983 | Schubring | 296/37.12 |
| 4,526,416 A | * | 7/1985 | Rode | 296/100.16 |
| 5,467,507 A | * | 11/1995 | Marsh et al. | 24/298 |
| 5,546,639 A | * | 8/1996 | Lacore et al. | 24/265 H |
| 5,645,310 A | * | 7/1997 | McLaughlin | 296/57.1 |
| 5,707,095 A | * | 1/1998 | Pribak et al. | 296/57.1 |
| 5,956,834 A | * | 9/1999 | Sardo et al. | 296/214 |
| 5,975,608 A | * | 11/1999 | Jarman | 296/26.11 |
| 6,082,801 A | * | 7/2000 | Owen et al. | 296/57.1 |
| 6,120,076 A | * | 9/2000 | Adsit et al. | 296/57.1 |
| 6,279,979 B1 | * | 8/2001 | Cauley | 296/57.1 |
| 6,390,527 B1 | | 5/2002 | Leftridge | |
| 6,431,630 B1 | | 8/2002 | Meinke | |
| 6,450,559 B1 | * | 9/2002 | Renke | 296/57.1 |
| 6,607,232 B2 | * | 8/2003 | Katulka | 296/57.1 |
| 6,832,801 B2 | * | 12/2004 | Zagoroff | 296/57.1 |
| 6,857,678 B2 | * | 2/2005 | Lisk, III | 296/57.1 |
| 2001/0024046 A1 | * | 9/2001 | Mizuta | 296/57.1 |

* cited by examiner

Primary Examiner—Kiran B. Patel
(74) Attorney, Agent, or Firm—Sand & Sebolt

(57) ABSTRACT

An insert and a tailgate cable assembly incorporating the same. The tailgate cable assembly is a cable having eyelet connectors at each end and which is used to secure the sidewall of a vehicle to a rotatable tailgate. Fasteners extending from the sidewall and tailgate are received through apertures in the eyelets. At least one of the eyelets incorporates a removable insert that is rotatable between a first position, where the fastener may be either inserted or withdrawn from the eyelet, and a second position where the insert locks the fastener within the aperture in the eyelet. The insert is a "C"-shaped member that interlocks with the eyelet's interior peripheral surface surrounding a portion of the aperture.

25 Claims, 8 Drawing Sheets

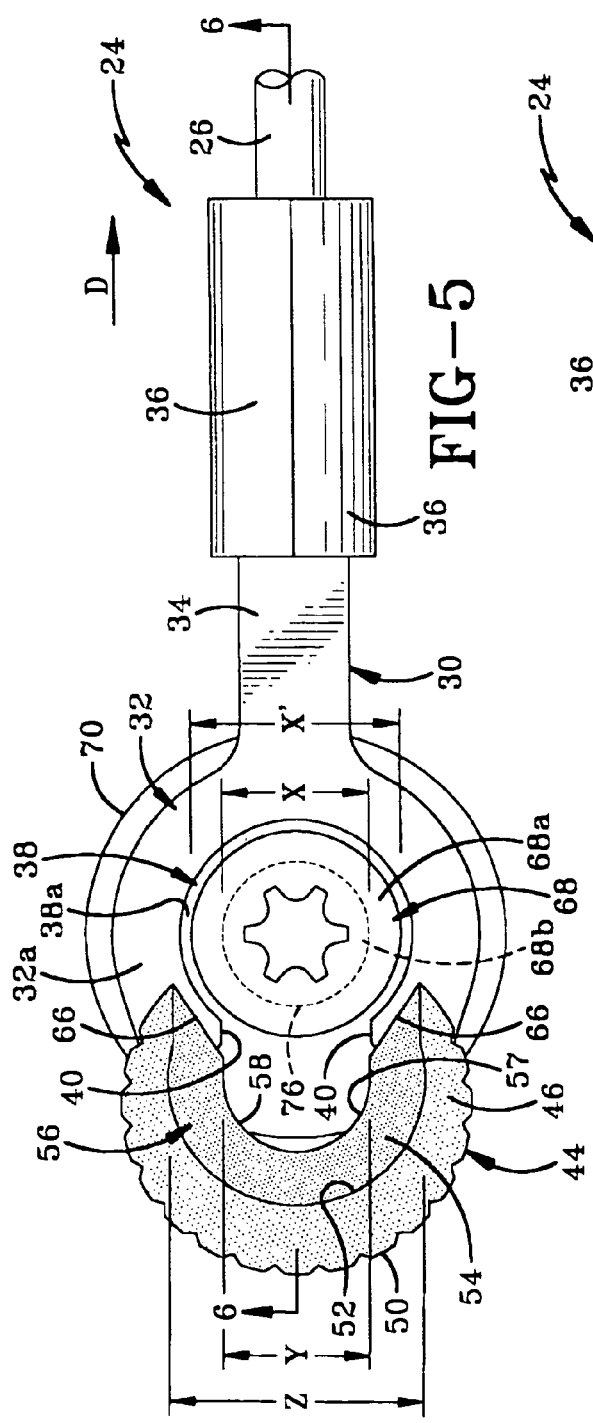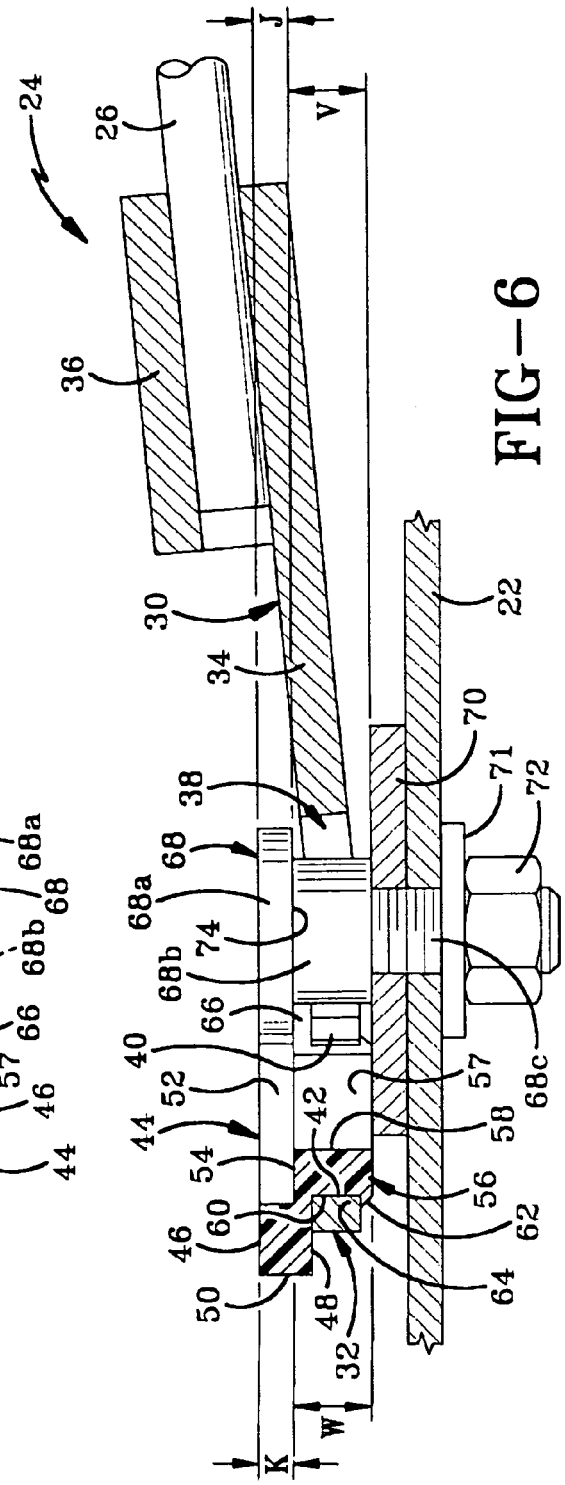

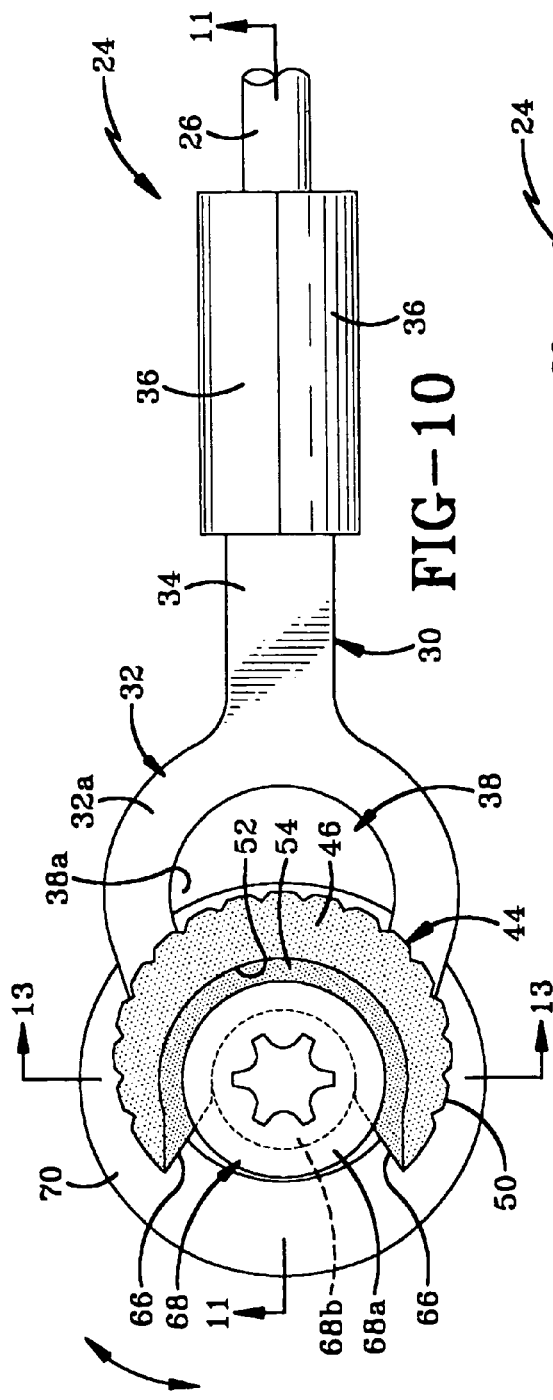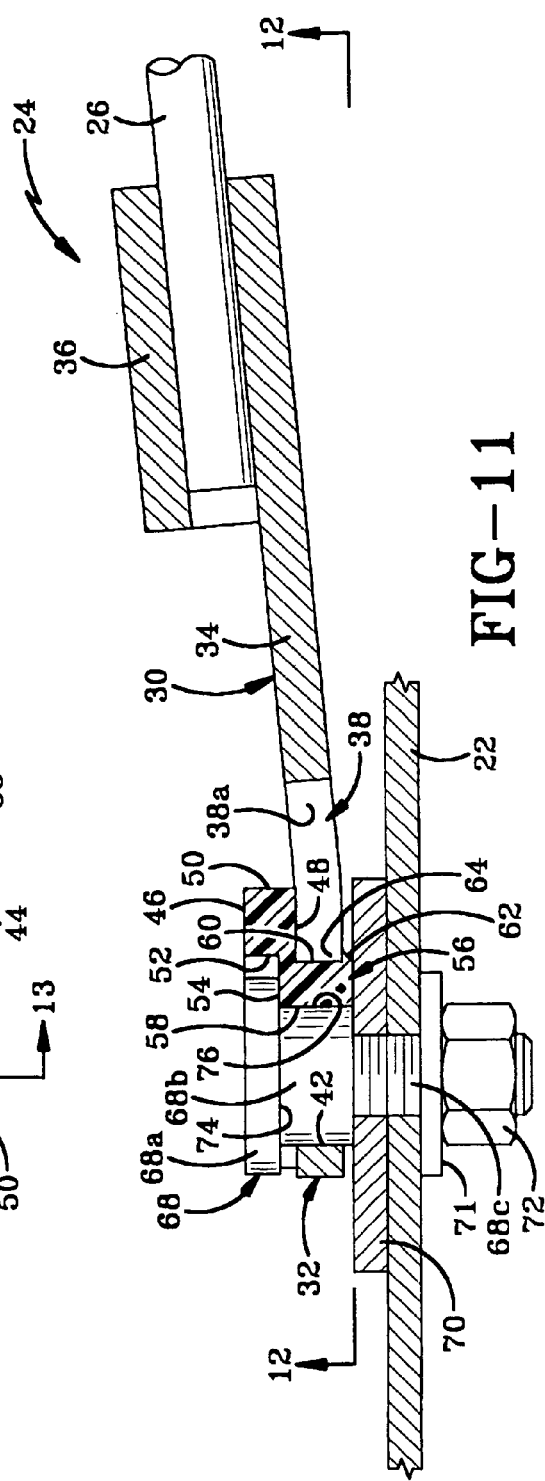

INSERT FOR A TAILGATE CABLE ASSEMBLY AND A TAILGATE CABLE ASSEMBLY INCORPORATING THE SAME

BACKGROUND OF THE INVENTION

1. Technical Field

This invention generally relates to mechanisms for supporting vehicle tailgates. More particularly, the invention relates to an insert and cable assembly for supporting a tailgate when in a substantially horizontal open position. Specifically, the invention relates to an insert that interlocks with an eyelet disposed at one end of a cable, the insert being selectively rotatable within the eyelet to secure the eyelet to a fastener extending from the vehicle sidewall or tailgate.

2. Background Information

Many vehicles, such as pickup trucks, are provided with tailgates that may be swung between open and closed positions. When the tailgate is in the closed position, it is substantially vertically oriented with respect to the vehicle bed floor and a load held on the bed is prevented from sliding off the vehicle and into the road. When the user wishes to unload goods carried on the vehicle, the tailgate is lowered into a substantially horizontal open position, thereby providing easier access to the load.

Tailgates are typically supported in the open position by a pair of coated, flexible steel cables that are each connected at a first end to the vehicle sidewall and at a second end to one side of the tailgate. The cables are connected to the sidewall and tailgate by way of fasteners which are inserted through eyelets extending outwardly from the first and second ends of the cable. It is common for the two eyelet connectors to be dissimilar in shape. The tailgate eyelet connector typically is generally "O"-shaped with a centrally located circular hole formed therein. The sidewall eyelet connector may be generally elliptical in shape with a keyhole-shaped aperture formed therein. A spring-biased, substantially rectangular plate is clamped around the base of the sidewall eyelet and extends partially into the aperture. The fasteners for securing the eyelets to the vehicle may be bolts, rivets, pins and screws or any other suitable connector device. The shaft of the fastener received through the tailgate eyelet connector is of substantially the same size as the centrally-located hole. Consequently, very little rattling noise is produced by that connection when the vehicle is moving. A rattle is, however, frequently generated at the connection between the sidewall and the sidewall eyelet connector. The fastener used for this connection has a head portion with a diameter that is smaller than the wider portion of the keyhole-shaped aperture but is larger than the narrower portion of the aperture. The spring-biased plate extends into the wider portion of the aperture and toward the narrower portion of the aperture. The fastener is inserted into the wider portion of the aperture by pushing the plate out of the way either with the head of the fastener or with a screwdriver or similar device. The eyelet is then moved relative to the fastener so that the shaft of the fastener slides into the narrower portion of the aperture. The plate springs back into its initial position, thereby clamping the fastener and eyelet together. The diameter of the shaft of the fastener is typically less than the diameter of the narrower portion of the aperture. Consequently, when the vehicle is moving, there is movement between the eyelet and the fastener shaft and a rattling noise is generated. In addition to this problem, the plate tends to contribute to the corrosion of the eyelets because it is usually made from a dissimilar metal and tends to set up a galvanic corrosion cell. Additionally, it is common for users to remove the tailgate altogether so that they can either load or unload a particularly heavy item from the vehicle bed or carry a heavy item on the bed floor. The above-described sidewall eyelet connector is not particularly easy to release and frequently requires that a screwdriver or similar tool be used to force the plate out of engagement with the fastener. This can make the removal of the tailgate more difficult.

There is therefore a need in the art for a cable assembly that may be connected to both the sidewall and tailgate quickly and easily. There is furthermore a need for a cable assembly that does not rattle when the vehicle is moving and has a decreased tendency to rust.

SUMMARY OF THE INVENTION

The present invention is directed to an insert that may be used in tailgate cable assemblies and to a tailgate cable assembly incorporating the same. The tailgate cable assembly is an elongated, flexible cable that has eyelet connectors at each end and which is used to secure a rotatable tailgate to the sidewall of a vehicle. Fasteners extending from the sidewall and tailgate are received through apertures in the eyelets. At least one of the eyelets incorporates a removable insert that is rotatable between a first position, where the fastener may be either inserted or withdrawn from the eyelet, and a second position where the insert locks the fastener within the aperture in the eyelet. The insert is a "C"-shaped member that has a channel formed in a flange extending from its rear wall and a portion of the eyelet's interior peripheral surface surrounding the aperture is received within the channel and locks the C-shaped member and eyelet together.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

FIG. 5 is a front elevational view of the sidewall connector of FIG. 4;

FIG. 6 is a cross-sectional side view of the sidewall connector through line 6—6—of FIG. 5;

FIG. 10 is a front elevational view of the sidewall connector with the insert rotated into the locked position around the fastener;

FIG. 11 is a cross-sectional side view of the sidewall connector through line 11—11 of FIG. 10;

DETAILED DESCRIPTION OF THE INVENTION

Figure 1:
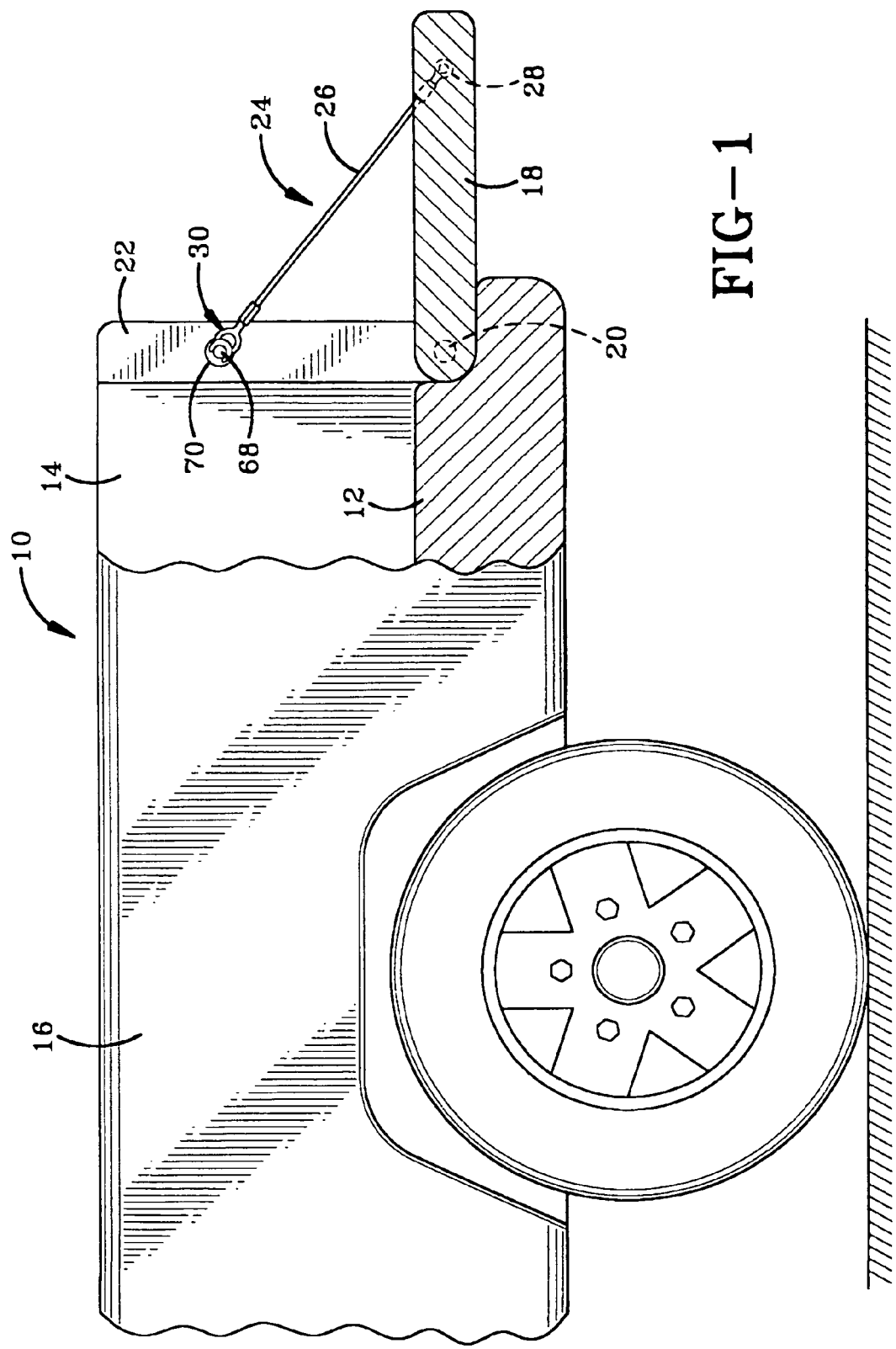
FIG. 1 is a side view of a vehicle with the tailgate in an open position showing the tailgate being supported by the cable assembly in accordance with the present invention.
Figure 2:
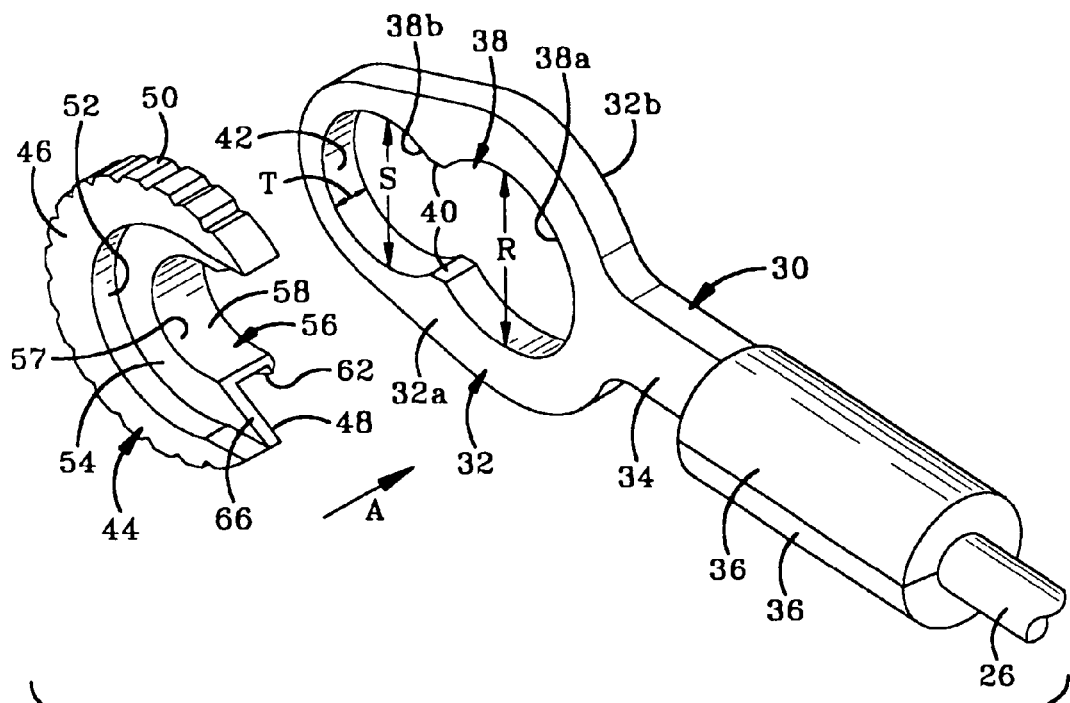
FIG. 2 is an exploded perspective view of the sidewall eyelet connector end of the tailgate cable assembly.
Figure 3:
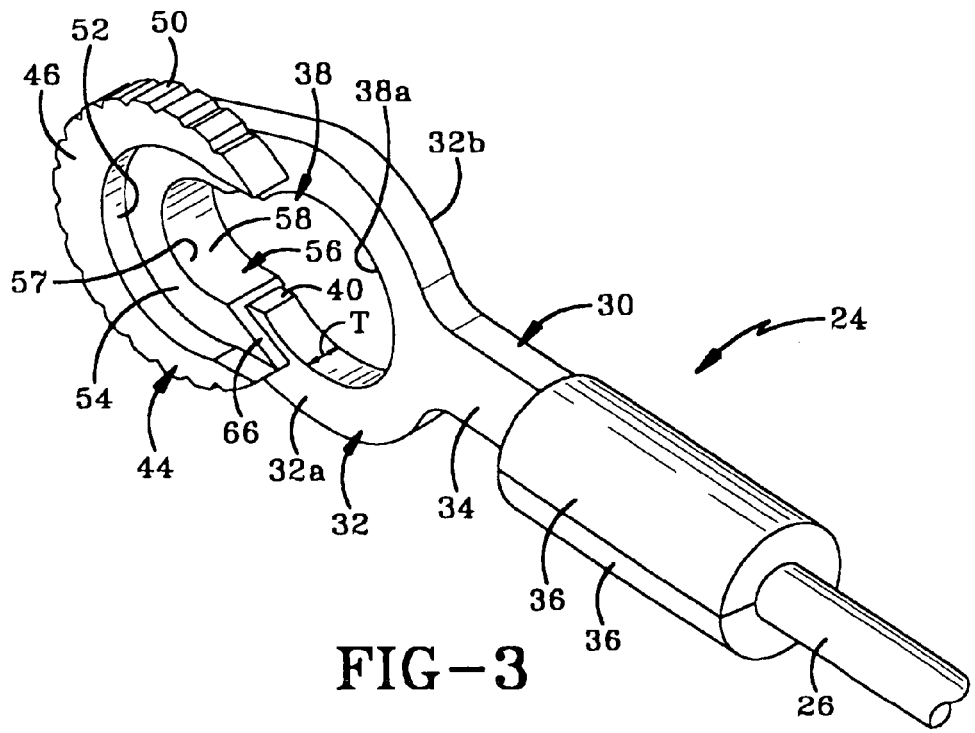
FIG. 3 is a perspective view of the sidewall connector in an open position.

Referring to FIGS. 1–3, there is shown a vehicle 10 of the type having a bed with a floor 12, sidewalls 14, 16 and a tailgate 18. Tailgate 18 is mounted to vehicle 10 by way of rod ends 20 and is rotatable about rod ends 20 between a vertical position (not shown) and a horizontal position (FIG. 1). Tailgate 20 and supports 22 on sidewalls 14, 16 are connected together by a pair of cable assemblies 24 that assist in supporting tailgate 20 when it is in the horizontal, open position. Only one of the cable assemblies 24 is illustrated in FIG. 1 and described below for the sake of clarity. It will be understood, however, that the two cable assemblies are substantially identical.

Cable assembly 24 comprises an elongated, flexible steel cable 26 having a tailgate connector 28 secured to a first end thereof and a sidewall connector 30 secured to a second end thereof. Tailgate connector 28 is of the type commonly used in the industry, being a substantially circular eyelet with a central hole therein and is secured to the tailgate by a suitable fastener inserted through the central hole. Sidewall connector 30 (FIGS. 2&3) comprises a base 32 having a shaft 34 extending outwardly therefrom. Shaft 34 includes a pair of flanges 36 that are crimped around cable 26 to secure connector 30 thereto. Base 32 has a substantially keyhole-shaped aperture 38 formed therein and aperture 38 has a wider portion 38a and a narrower portion 38b. The maximum width "R" of portion 38a is greater than the maximum width "S" of portion 38b. A lip portion 40 separates wider portion 38a from narrower portion 38b. Base 32 has a thickness "T". When viewed from the front, narrower portion 38b of base 32 is substantially C-shaped and has an arcuate interior peripheral surface 42.

Referring to FIGS. 2–6, an insert 44, in accordance with the present invention, is provided for engagement with base 32. Insert 44 is manufactured from a rigid material preferably plastics such as acetal, polyester, nylon and filled nylon materials or metals compatible with those from which base 32 is manufactured. Insert 44 comprises a substantially C-shaped member with a front wall 46, a rear wall 48, an outer peripheral wall 50 and an interior opening 57. Outer peripheral wall 50 of insert 44 preferably is ridged so as to provide a gripping surface for the fingers of a user. Front wall 46 of insert 44 includes a C-shaped groove 52 and a recessed fastener-engaging surface 54. As may be seen from FIGS. 2&3, both narrower portion 38b of aperture 38 and insert 44 are substantially C-shaped and have a substantially identical radius of curvature. A flange 56 extends outwardly from and normal to rear wall 48. Flange 56 is generally C-shaped when viewed from the rear, has an interior surface 58, an exterior surface 60 and a chamfered lip 62. Interior surface 58 of flange 56 defines an interior opening 57 within insert 44. An U-shaped channel 64 (FIG. 6) is formed between lip 62 and rear wall 48 of insert 44. The width of channel 64 is substantially equal to the width "T" of base 32. As may be most easily seen in FIG. 5, the leading edges 66 of groove 52 and surface 54 are angled to guide a fastener 68 toward the interior surface 58 of flange 56.

Figure 2A:
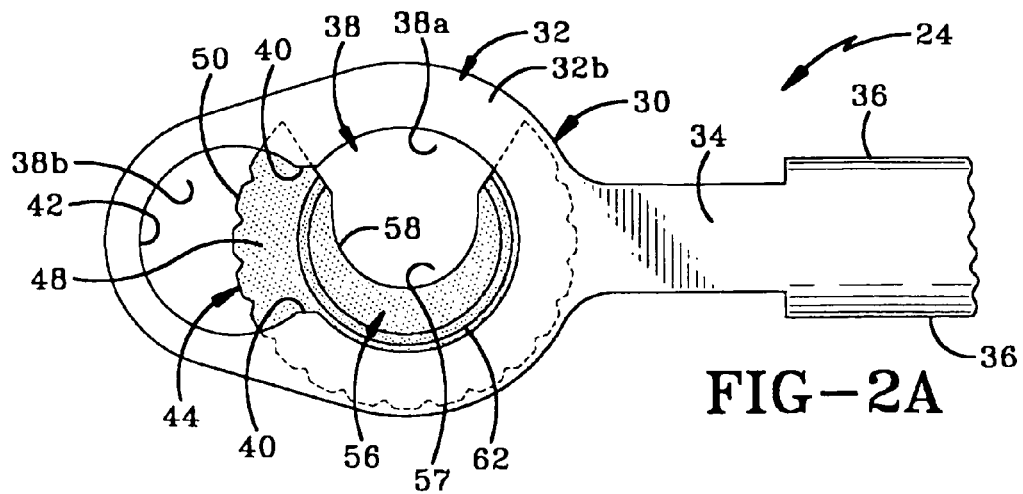
FIG. 2A is a rear elevational view of the sidewall connector with an insert received within a wider portion of the aperture.
Figure 2B:
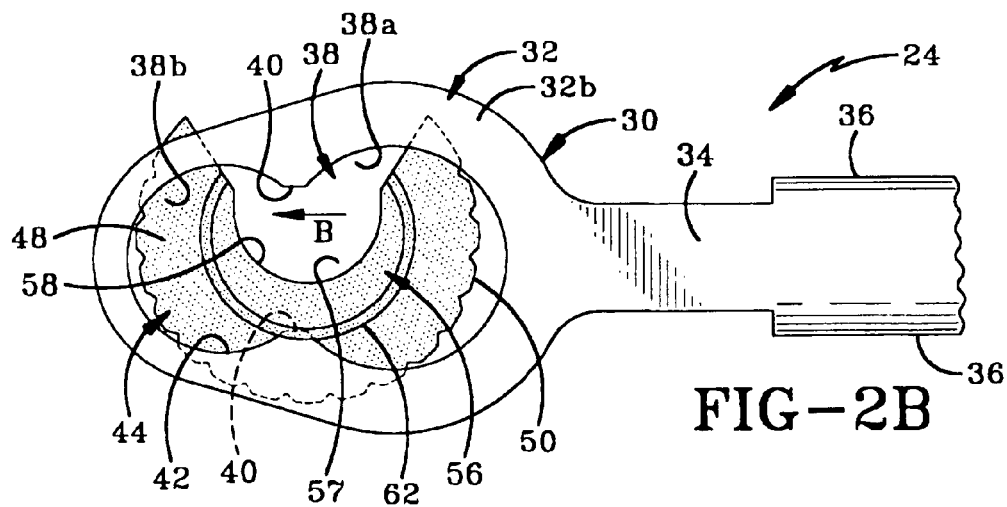
FIG. 2B is a rear elevational view of the sidewall connector with the insert being moved into the narrower portion of the aperture.
Figure 2C:
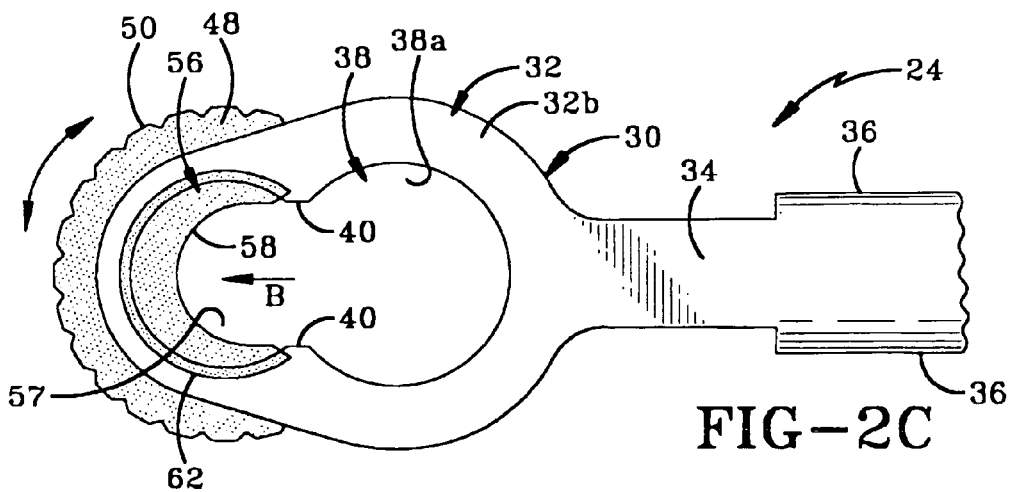
FIG. 2C is a rear elevational view of the sidewall connector with the insert engaged with the base.
Figure 4:
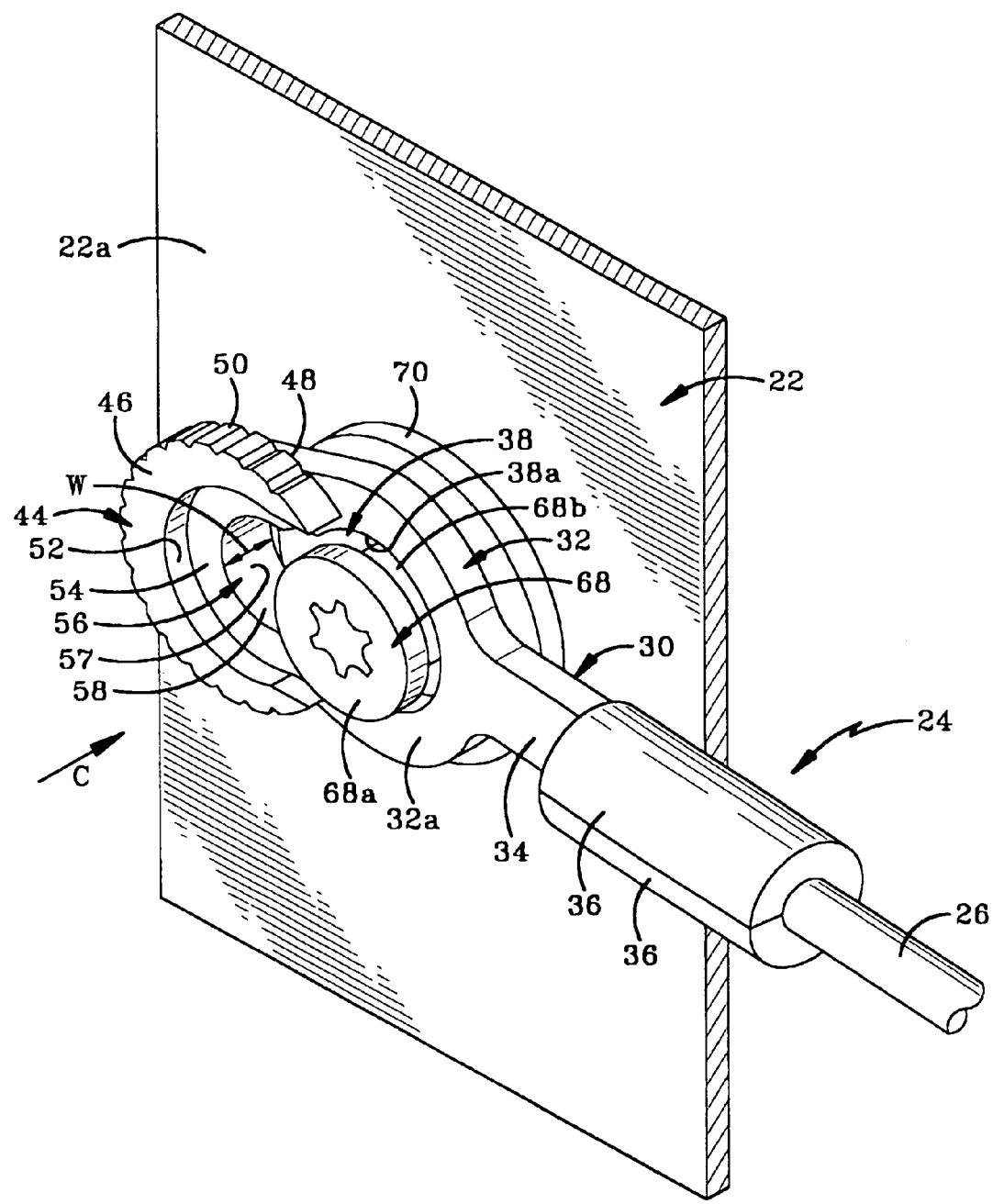
FIG. 4 is a perspective view of the sidewall connector with the wider portion of the hole positioned over a fastener extending from the vehicle sidewall.

Referring to FIGS. 2 through 2C, insert 44 is engaged with sidewall connector 30 in the following manner. Flange 56 of insert 44 is inserted into the wider portion 38a of aperture 38 in base 32 and is moved in the direction of arrow "A" (FIG. 2) until the rear wall 48 of insert 44 rests on the front surface 32a of base 32. The initial orientation of insert 44 relative to base 32 is not critical because the component is twisted slightly as it is slid along base 32 and into narrower portion 38b of aperture 38. So, for example, insert 44 may be oriented as shown in FIG. 2 or as it is shown in FIG. 2A or in any other orientation that will bring rear surface 48 into contact with front surface 32a of base 32. Insert 44 is then moved in the direction of arrow "B" (FIG. 2B) until flange 56 is received in narrower portion 38b of aperture 38. Insert 44 is twisted to cause chamfered lip 62 on flange 56 to ride over rear surface 32b of base 32. Insert 44 is simultaneously twisted and moved in the direction of arrow "B" until the interior surface 42 of base 32 is received within the channel 64 of insert 44 and abuts exterior surface 60 of flange 56 (FIGS. 2 & 6). Flange 56 frictionally engages base 32 to retain insert 44 on base 32. Once insert 44 is retained on base 32, cable assembly 24 is ready to be connected to support 22 and insert 44 is in a first position where it is able to receive a fastener 68 therein. The portion of base 32 that surrounds narrower portion 38a of aperture 38 and onto which insert 44 is engaged, is substantially flat (see FIG. 6) and insert 44 is rotatable on this substantially flat portion of base 32 as will be hereinafter described.

Fastener 68 comprises a head 68a, a body 68b and a shaft 68c. Fastener 68 is mounted to support 22 via washers 70, 71 and nut 72 to support 22. Body 68b of fastener 68 has a height "V" which is substantially the same as the width "W" of flange 56 of insert 44 (FIG. 6). The diameter "X" of body 68b of fastener 68(FIG. 5) is substantially the same as the width "Y" of opening 57 formed by interior surface 58 of flange 56. Head 68a of fastener 68 has a diameter "X" that is greater than the diameter "Y" of interior surface 58 of insert 44, but is less than the diameter "Z" of groove 52 of insert 44. The height "J" of head 68a of fastener 68 may be less than, equal to or greater than the depth "K" of groove 52. When fastener 68 is mounted to support 22, it extends outwardly from a front surface 22a of support and is disposed substantially at right angles thereto.

Figure 7:
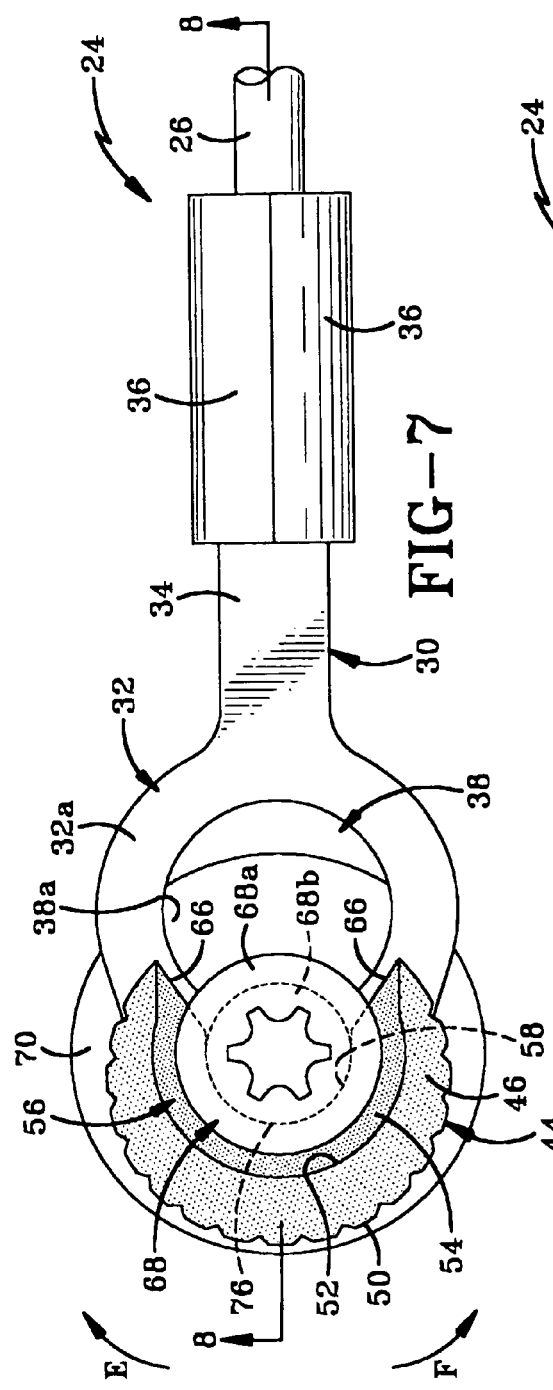
FIG. 7 is a front elevational view of the sidewall connector with the fastener engaged in the narrower portion of the hole.
Figure 8:
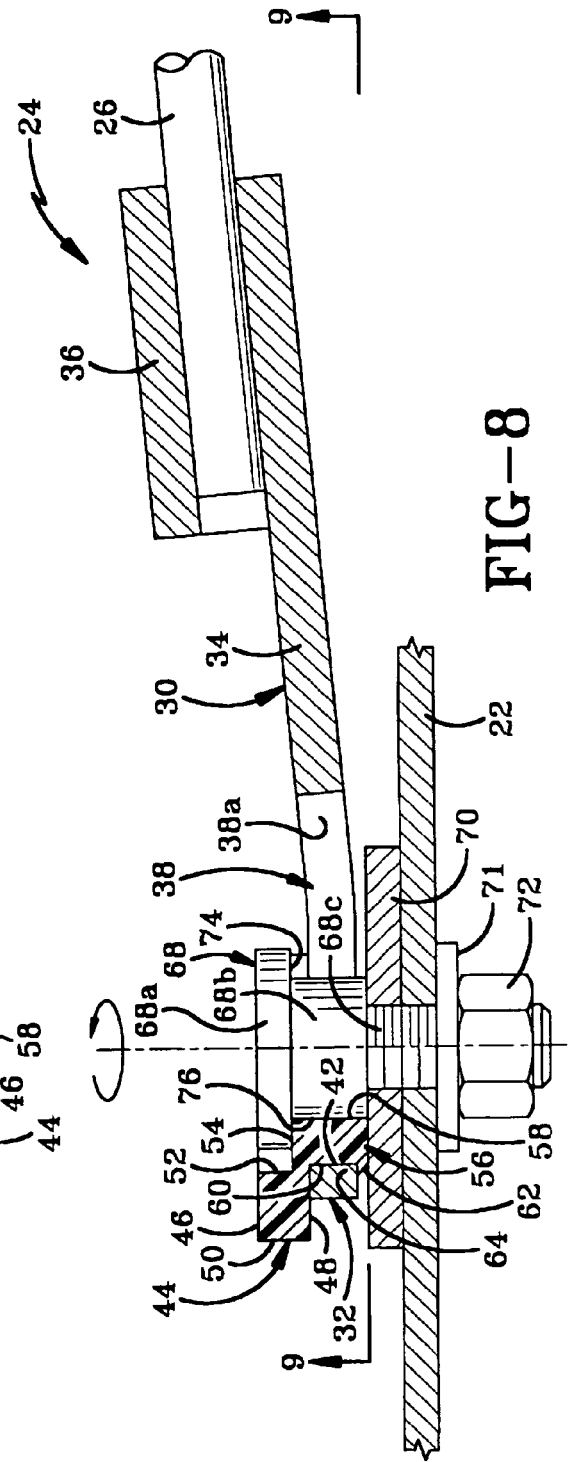
FIG. 8 is a cross-sectional side view of the sidewall connector through line 8—8—of FIG. 7.
Figure 9:
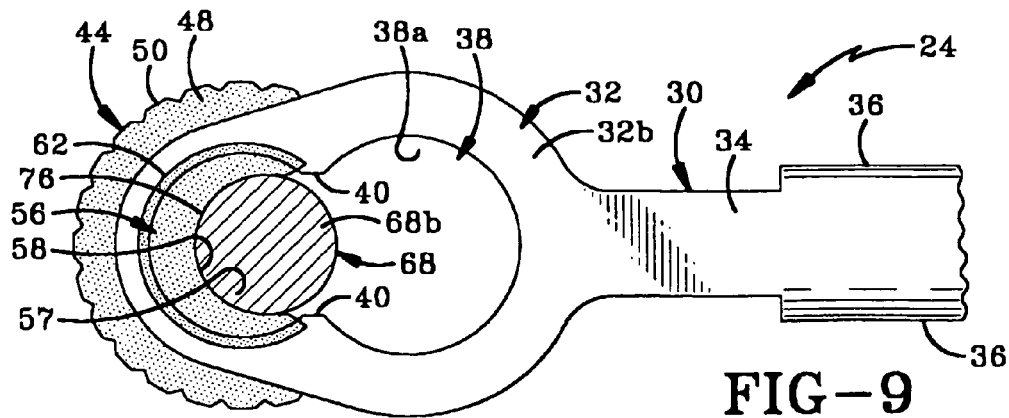
FIG. 9 is a partial cross-sectional rear view of the sidewall connector through line 9—9 of FIG. 8.
Figure 12:
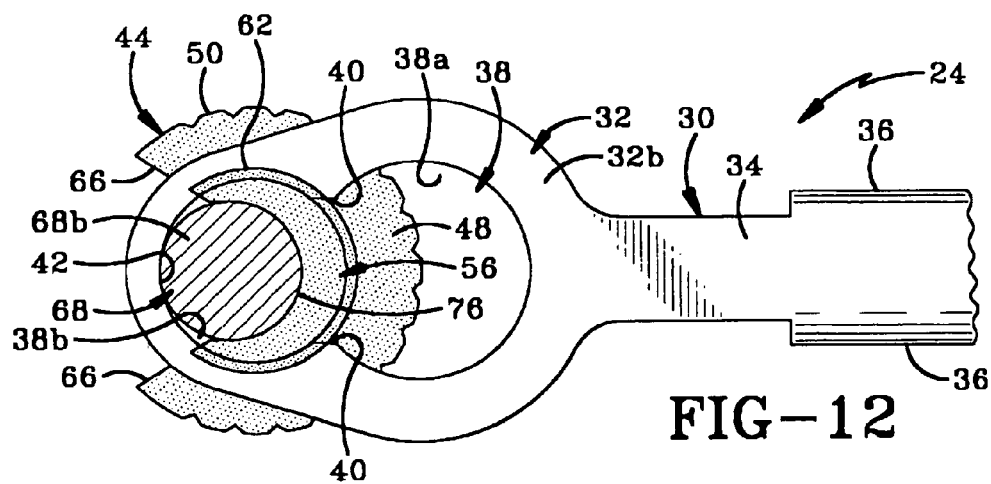
FIG. 12 is a rear elevational view of the sidewall connector through line 12—12 of FIG. 11.
Figure 13:
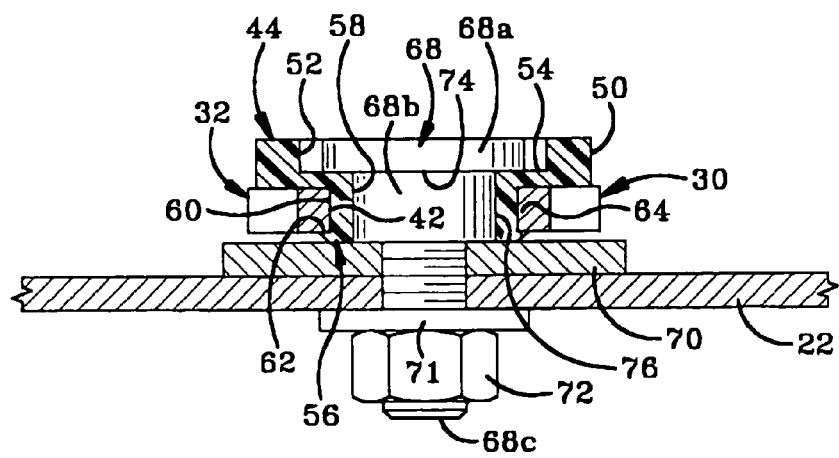
FIG. 13 is a cross-sectional left side view of the sidewall connector through line 13—13 of FIG. 10.

Referring to FIGS. 4–13, cable assembly 24 may be secured to fastener 68 in the following manner. Sidewall connector 30 of cable assembly 24 is brought into the proximity of fastener 68 and is moved in the direction of arrow "C" (FIG. 4) so that fastener 68 enters wider portion 38a of aperture 38. The user grasps cable 26 and pulls the same in the direction of arrow "D" (FIG. 5) so that base 32 slides laterally with respect to washer 70. This lateral movement causes base 32 to slide past fastener 68 so that body 68b of fastener 68 enters narrower portion 32b of base 32. Continued movement of cable 26 in the direction of arrow "D" causes body 68b to slide between leading edges 66 of insert 44 and toward interior surface 58 of flange 56. The lateral movement causes the lower surface 74 of head 68a to ride over fastener engaging surface 54 of insert 44. Ultimately, the outer surface 76 of body 68b abuts the interior surface 58 of flange 56 (FIGS. 7&8). The relative sizes of the body 68b and insert 44 causes the sidewall connector 30 to be wedged between lower surface 74 of head and washer 70. However, fastener 68 is not locked within sidewall connector 30 and the two components may be disengaged from each other by pushing cable 26 in the opposite direction to arrow "D". In order to lock fastener 68 and sidewall connector 30 together, insert 44 must be rotated in the direction of either arrow "E" or arrow "F" (FIG. 7) until insert 44 is disposed in the position indicated in FIGS. 10–13. Insert 44 rotates about an axis Q–Q' (FIG. 8) that lies substantially at ninety degrees to the flat portion of base 32 surrounding narrower portion 38b of aperture 38. In this position, insert 44 prevents fastener 68 from being removed from aperture 38. Furthermore sidewall connector 30 is prevented from moving laterally in the direction of arrow "D" or in the opposite direction thereto, but is free to rotate around fastener 68 as is indicated by the arrow in FIG. 10.

Insert 44 may be provided as a retrofit component for cable assemblies known in the prior art that are presently manufactured with a spring-biased plate (not shown) extending into the wider portion the aperture in the base. In order to retrofit such known cable assemblies with insert 44, the spring-biased plate would be removed from the base and the insert 44 could then be connected into the base 32 in the manner described above with respect to the cable assembly in accordance with the present invention. Alternatively, a cable assembly in accordance with the present invention may be manufactured and then sold with the insert 44 engaged with the base 32.

The tailgate connector 28 of the cable assembly 24 may be substantially identical to the tailgate connector of cable assemblies known in the prior art and may furthermore be connected to the tailgate of a vehicle in the same manner as previously known tailgate connectors. However, it will be understood that the tailgate connector 28 of the present invention may be of substantially identical structure and function as the sidewall connector 30 as herein disclosed.

When cable assembly 24 is connected between tailgate 18 and support 22 and tailgate 18 is in the open position, cable 26 is in tension and interior peripheral surface 42 of base 32 lies in direction contact with fastener 68. Insert 44 does not bear any significant load when cable 26 is in tension. The only load borne by insert 44 is equal to the column strength of cable 26 itself. When tailgate 18 is in a closed position, cable 26 is no longer under tension and insert 44 again does not bear any significant load.

It will further be understood that while fastener engaging surface 54 is disposed a distance inwardly of front wall 46 of insert 44, surface 54 and front wall 46 may be coplanar with each other. Front wall 46 is provided a distance outwardly from surface 54 so that outer peripheral wall 50 of insert 44 has some depth for easy of rotating insert 44 between its open and closed positions. Insert 44 is designed to be eccentric to the centerline of fastener 68. This provides minimal clearance between fastener 68 and the rotated insert 44 to substantially prevent movement and subsequent rattle of the installed assembly.

Furthermore, while insert 44 is shown in use on a sidewall connector 30 having a keyhole-shaped aperture 38 therein, it will be understood that insert 44 may be used on a sidewall connector having a differently shaped aperture therein. Insert 44 would be engaged with the base of the sidewall connector in the manner as described above and would then be utilized to define a region within that differently shaped aperture that would be substantially the same diameter as the fastener body to which the sidewall connector is to be secured.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A tailgate cable assembly for connecting a vehicle tailgate to a sidewall of a vehicle, wherein the cable assembly comprises:
    an elongated cable having a first end and a second end;
    a gate-connector eyelet mounted on the first end of the cable and adapted to secure the cable to a first fastener extending outwardly from the tailgate;
    a side-connector eyelet mounted on the second end of the cable and adapted to secure the cable to a second fastener extending outwardly from the sidewall;
    a removable locking member engageable with one of the side-connector eyelet and gate-connector eyelet; the locking member being rotatable between a first position, where one of the first and second fasteners may be selectively engaged with or disengaged from the one of the side-connector eyelet and gate-connector eyelet; and a second position where the one of the first and second fasteners is secured to the one of the side-connector eyelet and gate-connector eyelet.

2. The tailgate cable assembly as defined in claim 1, wherein the removable locking member is engageable with the side-connector eyelet and wherein the locking member is rotatable between a first position, where the second fastener may be selectively engaged with or disengaged from the side-connector eyelet; and a second position where the second fastener is secured to the side-connector eyelet.

3. The tailgate cable assembly as defined in claim 2, wherein the side-connector eyelet has an aperture through which the locking member is received and the aperture has an open side; and wherein the locking member covers the open side of the aperture when the locking member is in the second position.

4. The tailgate cable assembly as defined in claim 3, wherein the aperture is substantially C-shaped and the locking member is substantially C-shaped and defines a C-shaped hole therein; and wherein the aperture and the C-shaped hole of the locking member are aligned when the locking member is in the first position.

5. The tailgate cable assembly as defined in claim 2, wherein the side-connector eyelet has a first surface with an aperture formed therein and a peripheral surface surrounding the aperture; and wherein the locking member is a substantially C-shaped member having:
    a fastener-engaging surface adapted to engage a head of the second fastener;
    a rear surface adapted to abut the first surface of the side-connector eyelet;
    a flange extending outwardly from and normal to the rear surface; whereby the flange engages the peripheral surface of the eyelet.

6. The tailgate cable assembly as defined in claim 5, wherein the locking member further comprises:
    a peripheral lip formed on the flange; whereby a channel is formed between the rear surface of the C-shaped member and the lip; and
    wherein the C-shaped member is adapted to be inserted into the aperture in the side-connector eyelet and to engage a portion of the peripheral surface of the side-connector eyelet within the channel.

7. The tailgate cable assembly as defined in claim 5, wherein the flange and side-connector eyelet frictionally engage to retain the C-shaped member on the side-connector eyelet.

8. The tailgate cable assembly as defined in claim 2, wherein part of the first surface of the side-connector eyelet is substantially flat and the locking member engages with that flat part of the first surface and rotates about an axis disposed substantially at right angles to the flat part of the first surface.

9. The tailgate cable assembly as defined in claim 1, wherein the locking member has an outer peripheral wall and the one of the gate-connector and side-connector eyelets has an outer peripheral wall; and the outer peripheral wall of the locking member extends beyond the outer peripheral wall of the one of the gate-connector and side-connector eyelets when the locking member is in the first position.

10. The tailgate cable assembly as defined in claim 5, wherein the locking member has a diameter and the flange has a diameter, and the diameter of the locking member is greater than the diameter of the flange.

11. The tailgate cable assembly as defined in claim 1, wherein the locking member has a diameter and the diameter of the locking member is substantially the same size as the diameter of one of the first and second fastener it is adapted to secure to the one of the gate-connector and side connector eyelets.

12. The tailgate cable assembly as defined in claim 1, wherein only the one of the gate-connector and side-connector eyelets touches the one of the first and second fasteners when the cable is in tension.

13. The tailgate cable assembly as defined in claim 1, wherein the locking member includes a fastener-engaging surface which lies substantially parallel to a portion of a front surface of the one of the gate-connector and side-connector eyelets when the locking member is in the second position; and wherein the one of the first and second fasteners has a head which is supported on the fastener-engaging surface of the locking member and does not come into contact with said portion of said front surface.

14. The tailgate cable assembly as defined in claim 1, wherein the locking member and the one of the gate-connector and side-connector eyelets each have a radius of curvature; and wherein the radius of curvature of the locking member and the radius of curvature of the one of the gate-connector and side-connector eyelets are substantially the same.

15. The tailgate cable assembly as defined in claim 2, wherein the aperture in the side-connector eyelet is substantially keyhole shaped having a wider portion and a narrower portion; and wherein the locking member engages the first surface of the eyelet surrounding the narrower portion of the aperture.

16. The tailgate cable assembly as defined in claim 1, wherein the locking member is manufactured from one of the group consisting of acetal, polyester, nylon and filled nylon plastics.

17. The tailgate cable assembly as defined in claim 1, wherein the locking plate includes a ribbed outer wall.

18. In combination, a cable assembly and fasteners for rotatably securing a tailgate to a sidewall of a vehicle, the combination comprising:
 a first fastener extending outwardly from the tailgate;
 a second fastener extending outwardly from the sidewall of the vehicle;
 an elongated cable having a first end and a second end;
 a gate-connector eyelet mounted on the first end of the cable;
 a side-connector eyelet mounted on the second end of the cable;
 a removable locking member;
 and wherein the locking member is selectively engageable with one of the side-connector and gate-connector eyelets to lock one of the first and second fastener within the one of the side-connector and gate-connector eyelets; and wherein the locking member is rotatable between a first position, where the one of the first and second fasteners may be selectively engaged with or disengaged from the one of the side-connector and gate-connector eyelets; and a second position where the one of the first and second fasteners is locked into the one of the side-connector and gate-connector eyelets.

19. The combination as defined in claim 18, wherein the removable locking member is engageable with the side-connector eyelet and the second fastener; and wherein the locking member is rotatable between a first position, where the second fastener may be selectively engaged with or disengaged from the side-connector eyelet; and a second position where the second fastener is secured to the side-connector eyelet.

20. The combination as defined in claim 19, wherein the side-connector eyelet has an aperture through which the locking member is received and the aperture has an open side; and wherein the locking member covers the open side of the aperture when the locking member is in the second position.

21. The combination as defined in claim 19, wherein the side-connector eyelet has a first surface with an aperture formed therein and a peripheral surface surrounding the aperture; and the second fastener has a head; and the locking member is a substantially C-shaped member having:
 a fastener-engaging surface adapted to engage the head of the second fastener;
 a rear surface adapted to abut the first surface of the side-connector eyelet;
 a flange extending outwardly from and normal to the rear surface; whereby the flange engages the peripheral surface of the eyelet; and
 a peripheral lip formed on the flange; whereby a channel is formed between the rear surface of the C-shaped member and the lip; and wherein the C-shaped member is adapted to be inserted into the aperture in the side-connector eyelet and to engage a portion of the peripheral surface of the side-connector eyelet within the channel.

22. The combination as defined in claim 21, wherein the locking member has a diameter and the flange has a diameter, and the diameter of the locking member is greater than the diameter of the flange.

23. The combination as defined in claim 18, wherein only the one of the gate-connector and side-connector eyelets touches the one of the first and second fasteners when the cable is in tension.

24. The combination as defined in claim 18, wherein the locking member and the one of the gate-connector and side-connector eyelets each have a radius of curvature; and wherein the radius of curvature of the locking member and the radius of curvature of the one of the gate-connector and side-connector eyelets are substantially the same.

25. The combination as defined in claim 18, wherein the locking member is manufactured.

* * * * *